I. F. KEPLER.
PROCESS OF MANUFACTURING WATER BAGS OR BOTTLES.
APPLICATION FILED JAN. 17, 1912.
1,164,196.
Patented Dec. 14, 1915
3 SHEETS—SHEET 1.
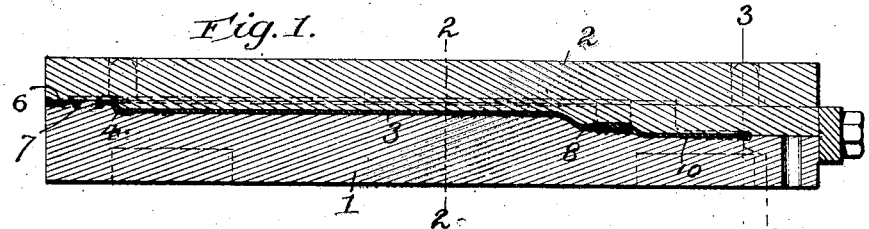
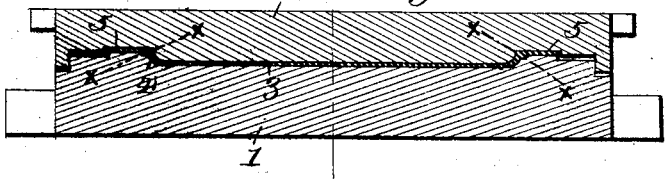
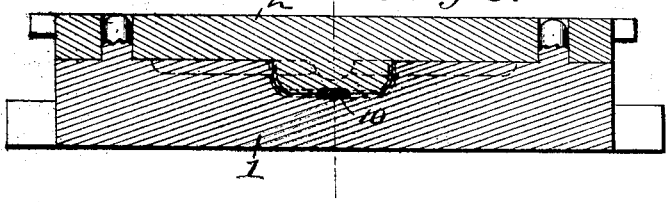
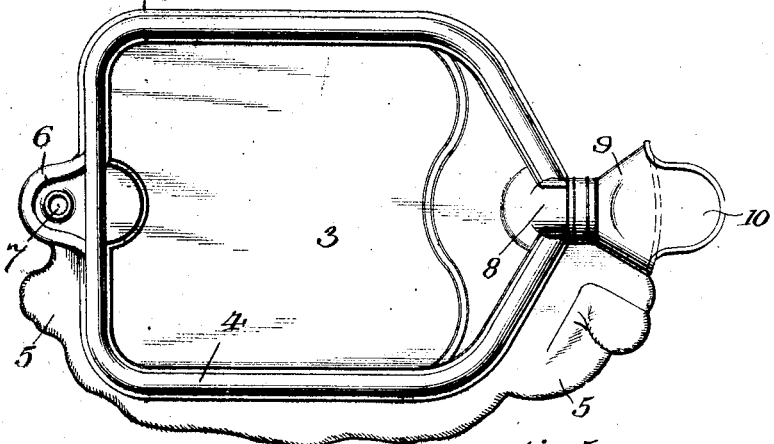
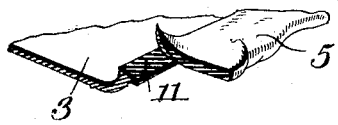
WITNESSES
INVENTOR:
Irvin F. Kepler,
by Dodge and Sons,
Attorneys I. F. KEPLER.
PROCESS OF MANUFACTURING WATER BAGS OR BOTTLES.
APPLICATION FILED JAN. 17, 1912.
1,164,196.
Patented Dec. 14, 1915.
3 SHEETS—SHEET 2.
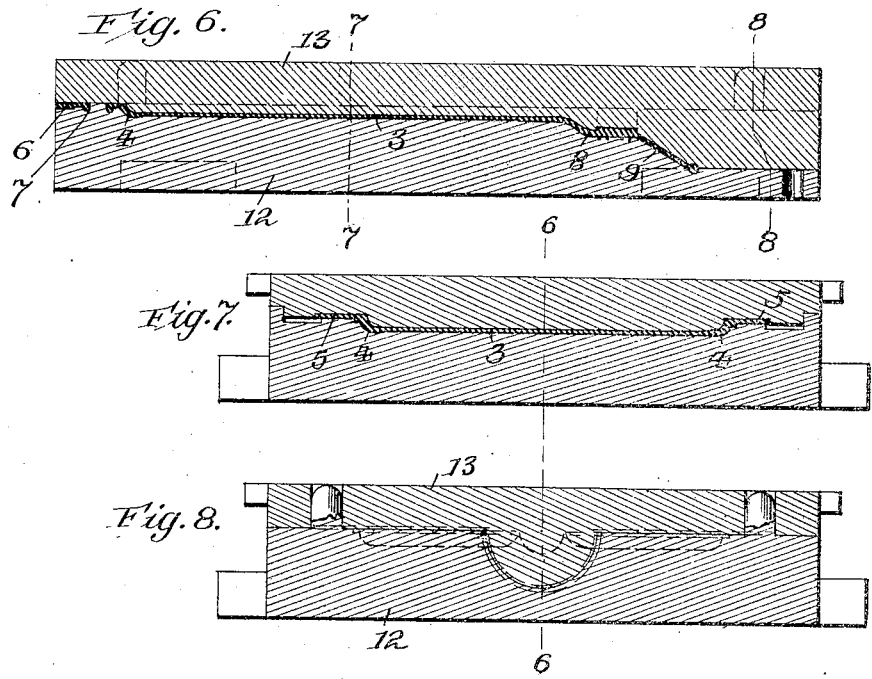
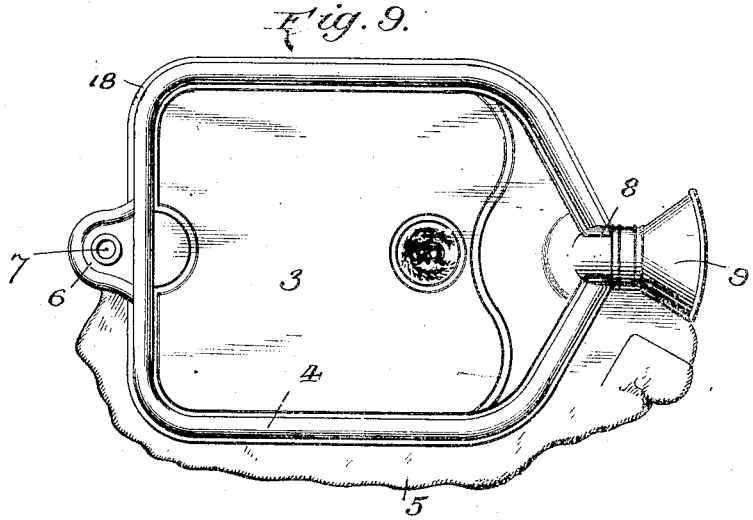
WITNESSES
INVENTOR:
Irwin F. Kepler,
by Dodge and Sons,
Attorneys

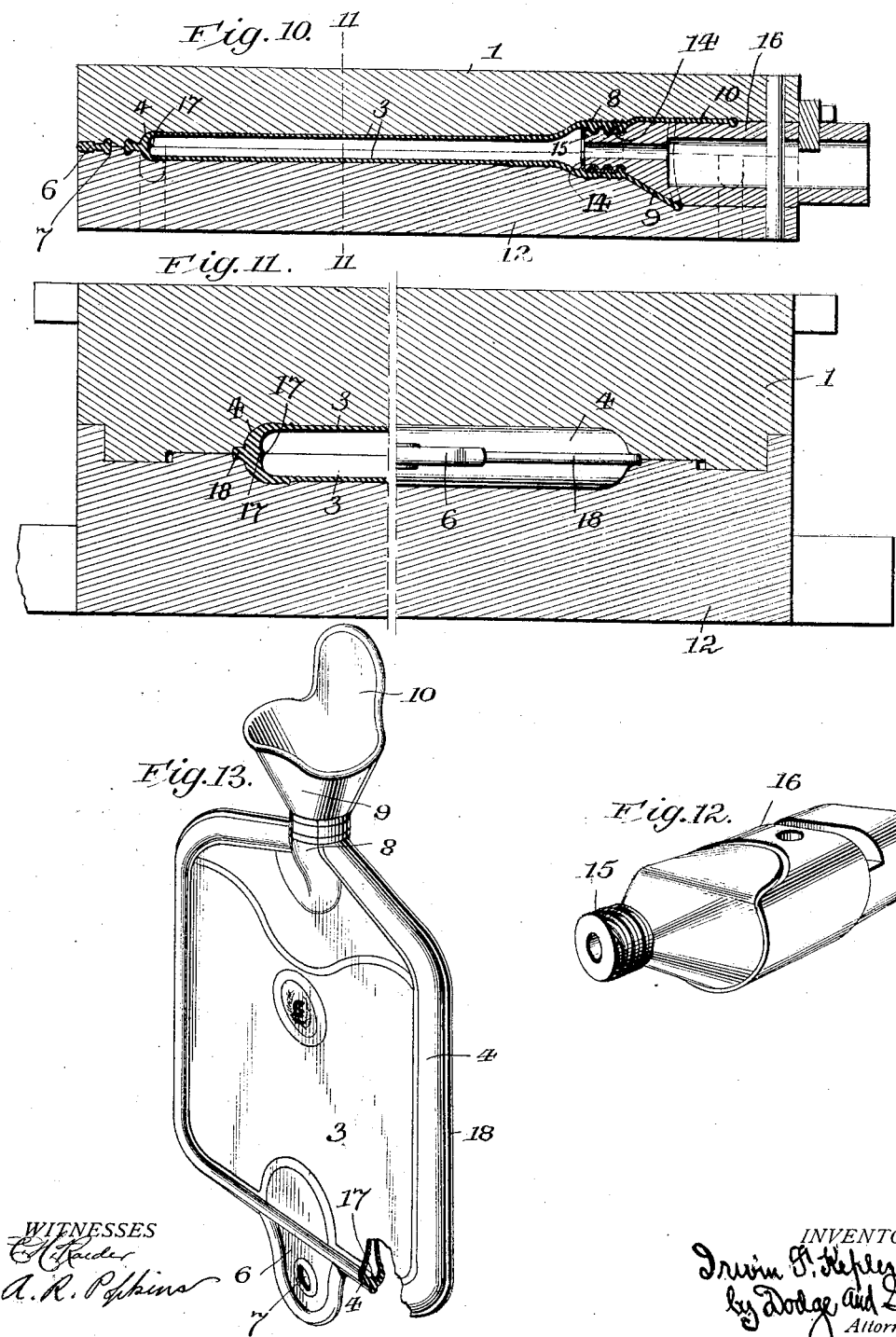

UNITED STATES PATENT OFFICE.

IRWIN F. KEPLER, OF AKRON, OHIO, ASSIGNOR, BY MESNE ASSIGNMENTS, TO THE B. F. GOODRICH COMPANY, A CORPORATION OF NEW YORK.

PROCESS OF MANUFACTURING WATER BAGS OR BOTTLES.

1,164,196. Specification of Letters Patent. Patented Dec. 14, 1915.

Application filed January 17, 1912. Serial No. 671,673.

*To all whom it may concern:*

Be it known that I, IRWIN F. KEPLER, a citizen of the United States, residing at Akron, in the county of Summit and State of Ohio, have invented certain new and useful Improvements in Processes of Manufacturing Water Bags or Bottles, of which the following is a specification.

My present invention pertains to an improved process for the manufacture of water-bags or bottles and other hollow rubber articles, as will be hereinafter set forth.

Broadly stated, the object of the invention is to produce what may be termed a one-piece article, inasmuch as the seam produced by my invention is of such strength as to amount to an integral weld. In the case of a hot-water bag, bottle or similar article, a feature of the invention consists in molding the plug or valve-socket in place at the same time as the last formative step is being taken in the production of the bag.

The bag or other hollow article produced by my process is formed without the use of seam-covering strips, separate throat pieces or the like, which, as is well known, are the weak points in such structures, frequently being the cause of the development of leaks or breaks.

The molds for producing the bag and the bag itself are illustrated in the annexed drawings, wherein:

Figure 1 is a longitudinal sectional view of one of the female and male molds employed in the production of one half of the bag; Figs. 2 and 3 cross-sections on the lines 2—2 and 3—3, respectively, of Fig. 1; Fig. 4 a plan view of one of the partially cured half-bag sections produced in the molds disclosed in Figs. 1 to 3, the bag-section being viewed from the underside, or that side which lies against the female mold, the protruding fin formed by the molds having been cut off of the upper half of the bag-section;
Fig. 5 a fragmentary perspective view of a portion of the bag-section, disclosing the manner in which the fin is cut or separated therefrom; Figs. 6, 7 and 8, sectional views, taken on the lines 6—6, 7—7 and 8—8, respectively, of said figures, showing the molds for producing the other partially cured half-bag or section; Fig. 9 a view similar to Fig. 4, illustrating the bag-section produced by the molds shown in Figs. 6, 7 and 8; Fig. 10 a longitudinal sectional view of the two female molds and the bag-sections carried thereby in their superposed position, the nipple or socket-carrier, which also coöperates with the female molds to produce and form the funnel, being shown in place; Fig. 11 a transverse sectional view, on a somewhat enlarged scale, of the two female dies taken on the line 11—11 of Fig. 10, with one half of the lower or tab end of the bag shown in full; Fig. 12 a perspective view of the combined thimble or socket-carrier and funnel mold; and Fig. 13 a perspective view of the completed bag, a portion of the edge being broken away to illustrate the manner in which the edge is reinforced or strengthened.

Stated in somewhat general terms, in the embodiment of my invention herein illustrated as applied to the production of water-bottles the process may be said to consist in first forming a half bag with a fin projecting outwardly from the margin thereof, said fin being forced outwardly from between the mold sections as the molds are pressed together to give the stock its initial form, and partial curing. The fin is then removed, the bag section at such time remaining within the female mold to which it adheres to a greater or less extent. The production of the fin or the forcing of the material outwardly in the process of shaping the part insures a solid and homogeneous ultimate edge when the fin is removed by cutting it across to form one of the joint-surfaces. This is an important point in producing water-bags, or other flat hollow articles, by means of my invention, since the flatness of the walls limits the amount of compression which can be transmitted to the joint-surfaces when the two halves are finally united. The invention is not, however, wholly confined to the formation of the joint or seam surfaces by cutting through a thickened fin.

A second half-bag is simultaneously or successively produced between another pair of molds the contour being the same or slightly different in part, according to the contour of the bag-funnel. Said second half has its fin removed and the two halves, still in the female molds, are superposed, the margins contacting throughout, except at the tab end of the funnel, a socket being screwed upon the funnel mold and positioned within or between the neck portions of the bag-sections. The parts are then vulcanized, the contacting edges and the bottom tab faces firmly uniting, in fact, becoming virtually an integral structure throughout, with a thoroughly welded seam or joint and, at the same time, the valve-socket is firmly vulcanized in place.

The process results in the production of a bag homogeneous throughout, and by reason of the shape of the molds and the manner of assembling the constituent parts of the bag, there is produced a reinforced edge which insures strength and stability.

Referring first to Figs. 1 to 5 inclusive, 1 denotes the female mold, having such conformation as to produce, in conjunction with the male mold 2, a half-bag of the form shown in Fig. 4, that is, a body 3, a thickened, upwardly-curved edge 4, from which there extends outwardly a fin 5 (shown as removed in the upper portion of Fig. 4), a tab section 6, having an opening 7, a throat-piece 8, and a funnel-section 9, having a handle or tab extension 10.

A sheet of raw rubber is first placed within the female mold, being of such size as to overlie the depressions therein, and then the male mold is superposed and forced down, the parts being so formed as to leave a space around those sections which produce the curved edge 4 into which the surplus rubber may be forced, producing the fin 5, see Fig. 2.

While embraced within the molds, the bag-section is partially cured, after which the male mold is withdrawn, leaving the bag-section adhering to the female mold. The fin 5 is then cut off along the line X—X, Fig. 2, leaving a flat and relatively broad face 11, Fig. 5.

The other half of the bag shown in Fig. 9, with the fin removed from the upper portion, is then produced by the molds shown in Figs. 6, 7 and 8, the female mold being designated by 12 and the male mold by 13. These molds are similar in form to the molds 1 and 2, except for the fact that no provision is made for the production of the funnel extension or tab 10. The same procedure is carried out as in the case of the other bag-section, the fin being cut off, producing a flat face or edge, as on the other bag-section. A threaded thimble or socket-piece 14, Fig. 10, is then screwed upon the threaded end 15, Fig. 12, of the combined socket-carrier and funnel mold, designated by 16. Said member, as will be seen upon reference to Fig. 12, is provided with depressed portions to receive the funnel and funnel-tab 10. Said member is positioned with reference to one of the female molds, the threaded socket bearing upon the throat-section 8, and the other female mold, with its half-bag, is superposed, the flat edges 11 by preference being treated with cement prior to bringing the parts together to render them more sticky and adhesive. The mold sections 1 and 12, with the mold member 16, will then be forced and locked together and the bag or bottle vulcanized. During the vulcanizing operation water will, from time to time, be injected into the bag to produce the requisite pressure to insure proper vulcanization and to keep the flat sides of the bag from coming together. When sufficiently cured, the molds 1 and 12 are withdrawn, and the mold member 16 rotated so as to withdraw the threaded end 15 from the socket or thimble 14.

During the process of vulcanization the flat faces 11 are forced together, and by reason of such vulcanization, become in effect merged, the finished product displaying no joint.

Owing to the shape of the parts and the pressure exerted thereon, a fin 17, Fig. 13, will be formed around the inner portion or margin of the bag, and a bead or rib 18 will be produced upon the outer edge. Thus the bag is strengthened where subject to the greatest strain.

Special attention is called to the fact that the plane $x$—$x$ of each surface 11 is inclined to the plane of the final joint, and this surface is higher on its inner edge than on its outer edge. One or both of the two meeting surfaces may be thus inclined and the effect is not only to form the strengthening inner rib 18, but also to increase the firmness of union between these two surfaces over what it would be if the surfaces were parallel.

The molds may, of course, be so formed as to give the bag any desired configuration and surface ornamentation.

Having thus described my invention, what I claim is:

1. The process of producing hollow rubber articles, which consists in making and semi-curing two halves or sections provided with joint-forming surfaces relatively so inclined that the inner edges of said surfaces meet first; pressing the two halves together; and finally curing the same while thus pressed together.

2. The process of making hollow rubber articles, which consists in molding two halves or sections and producing joint-forming surfaces thereon, at least one of which is higher at its inner than at its outer edge and is also broader than the thickness of the adjacent portion of the rubber wall; semi-curing said halves; pressing them together; and finally curing them while thus pressed together.

3. The process of manufacturing rubber bags, which consists in forming upon each of the sections of partially-cured rubber from which the bag is produced, a marginal portion of a thickness greater than that of the body stock; removing the excess material and thereby forming a broad, joint-forming surface; and finally bringing such surfaces of the sections together and vulcanizing the same.

4. The process of manufacturing rubber bags, which consists in producing bag sections of partially cured rubber and having homogeneous edges; placing said sections together, edge to edge; positioning a screw-threaded valve-socket in the neck portion formed by the sections; and finally vulcanizing the bag thus built up, with the valve socket in place therein.

5. The process of manufacturing rubber bags, which consists in producing bag-sections of partially cured rubber, each section having a fin extending therefrom; cutting the fin from the section at an angle to the plane of the final joint and thereby producing a joint forming surface having a raised inner edge; superimposing the sections thus formed; and finally vulcanizing the same.

6. The process of manufacturing rubber bags, which consists in producing bag-sections of partially cured rubber, each section comprising a half-bag having a curved thickened portion extending around the same and a fin projecting therefrom; cutting the fin from the section through the thickened portion and thereby producing a relatively wide and flat face; superposing the half-bags thus formed, with the flat faces contacting; and finally vulcanizing the same.

7. The process of manufacturing rubber bags, which consists in producing bag-sections of partially cured rubber, each section comprising a half-bag having a curved thickened portion extending around the same and a fin projecting therefrom; cutting the fin from the section through the thickened portion and thereby producing a relatively wide and flat face; superposing the half-bags thus formed, with the flat faces contacting; placing a threaded valve-socket within the neck of the bag; and finally vulcanizing the bag-sections.

In testimony whereof I have signed my name to this specification in the presence of two subscribing witnesses.

IRWIN F. KEPLER.

Witnesses:
  WALTER K. MEANS,
  ROBERT W. AITKEN.